United States Patent [19]

Oshiba

[11] Patent Number: 5,243,549
[45] Date of Patent: Sep. 7, 1993

[54] PORTABLE COMPUTER WITH DISPLAY IN PIVOTALLY MOUNTED COVER

[75] Inventor: Hirokazu Oshiba, Tokyo, Japan

[73] Assignee: Nippon Steel Corporation, Japan

[21] Appl. No.: 682,519

[22] Filed: Apr. 9, 1991

[30] Foreign Application Priority Data

Apr. 11, 1990 [JP] Japan .................................. 2-96751
Apr. 11, 1990 [JP] Japan .................................. 2-96754
Apr. 11, 1990 [JP] Japan .................................. 2-96755

[51] Int. Cl.⁵ .............................................. G06F 1/00
[52] U.S. Cl. .................................................... 364/708
[58] Field of Search .................... 364/708; 340/711

[56] References Cited

U.S. PATENT DOCUMENTS

| | | | |
|---|---|---|---|
| 4,497,036 | 1/1985 | Dunn | 364/708 |
| 4,739,316 | 4/1988 | Yamaguchi et al. | 340/711 |
| 4,742,478 | 5/1988 | Nigro, Jr. et al. | 364/708 |
| 4,769,764 | 9/1988 | Levanon | 364/708 |
| 4,842,531 | 6/1989 | Takemura | 364/708 |
| 5,001,659 | 3/1991 | Watabe | 364/708 |

FOREIGN PATENT DOCUMENTS 0066664 12/1982 European Pat. Off. ............ 364/708

Primary Examiner—Long T. Nguyen
Attorney, Agent, or Firm—Steven M. Rabin

[57] ABSTRACT

In a portable computer, with a body section having a keyboard with a plurality of keys, and a cover section having a display unit, rotatably coupled by a pair of hinge portions, the hinge portions are provided at opposite sides of the cover section and coupled with the rear end of the body section. A battery enclosing portion of the body section is provided between the hinge portions. With this construction, the battery enclosing portion does not obstruct a reduction in depth of the whole apparatus, so that a dimension of the display unit can be increased in comparison to conventional ones, and the display unit can be easily seen.

5 Claims, 4 Drawing Sheets

1

PORTABLE COMPUTER WITH DISPLAY IN PIVOTALLY MOUNTED COVER

BACKGROUND OF THE INVENTION

1. Field of the Invention

The present invention relates to a portable computer which can be easily carried and brought.

2. Description of the Related Art

A conventional portable computer is provided with a hinge portion at the front side spaced from the rear end of the body section by a certain distance (for example, U.S. Pat. No. 4,571,456). This is because a battery chamber and a modem enclosing portion are provided at the rear side of the hinge portion. Consequently a problem exists in that the dimensions of a cover section are limited and the dimensions of a display unit installed in the cover section can not be made large.

Also in a conventional portable computer, since a battery chamber and a modem enclosing portion are provided at the rear side of the hinge portion, these members limit the rotational angle of the cover section in an open state, relative to the body section, to about 135 degrees. The angle of 135 degrees does not produce a problem when the body section is used on a desk. However, if the computer has a liquid crystal display unit the body section is put and on a person's knee during the person's use outdoors or during use in a vehicle, the person's eyes are not orthogonal to the display unit and viewing of the display content becomes difficult.

In fact, from the viewpoint of human engineering, it is preferable that the open angle of the cover section is about 155 degrees, at least when the computer is to be placed for use on the user's knee. Consequently, a conventional portable computer is limited substantially to use on a desk rather than use on a knee.

SUMMARY OF THE INVENTION

In view of the above-mentioned circumstances, a first object of the present invention is to provide a portable computer where a display unit has larger dimensions than that of the prior art and can be easily seen.

A second object of the invention is to provide a portable computer having a display unit which can be easily seen even when the computer is used on a knee.

A first invention to achieve the first object is a portable computer wherein a body section having a keyboard with a plurality of keys arranged, and a cover section having a display unit, are coupled rotatably by a pair of hinge portions installed to the cover section, characterized in that the hinge portions are installed at both ends of the cover section and coupled with the rear end of the body section, and a battery enclosing portion is provided in the body section between the pair of hinge portions.

A second invention to achieve the first object is a portable computer wherein a body section having a keyboard with a plurality of keys arranged and a cover section having a display unit, are coupled rotatably by a hinge portion, characterized in that a modem enclosing portion enclosing a modem is provided in the body section to the inside of its left or right side.

A third invention to achieve the second object is in a portable computer wherein a body section having a keyboard with a plurality of keys arranged and a cover section having a display unit, are coupled rotatably by a hinge portion, characterized in that the hinge portion is installed at both ends of the cover section, and the cover section and the body section are coupled by the hinge portion at the rear end of the body section, and the cover section is rotatably by 180 degrees with respect to the body section.

In the first invention according to the above-mentioned constitution, since the hinge portions are installed at both ends of the cover section and coupled with the rear end of the body section, and the battery enclosing portion is provided between the pair of hinge portions, the battery enclosing portion does not obstruct a reduction in depth of the whole apparatus, and the dimensions of the display unit may be increased in comparison to that of the prior art and the display unit can be easily seen.

In the second invention according to the above-mentioned constitution, since the modem enclosing portion is provided in the body section to the inside of its lateral side, the modem enclosing portion does not obstruct a reduction in depth of the whole apparatus, and the dimensions of the display unit may be increased in comparison to that of the prior art and the display unit can be easily seen.

In the third invention according to the above-mentioned constitution, since the hinge portion is installed at both ends of the cover section and the cover section and the body section are coupled by the hinge portion at the rear end of the body section, the battery chamber or the like does not obstruct rotation of the hinge portion. Consequently, the cover section can be rotated by about 180 degrees and the user can use the computer in fixing the open angle of the cover section to any angle up to 180 degrees, whereby operability can be improved.

DESCRIPTION OF THE PREFERRED EMBODIMENT

Figure 1:
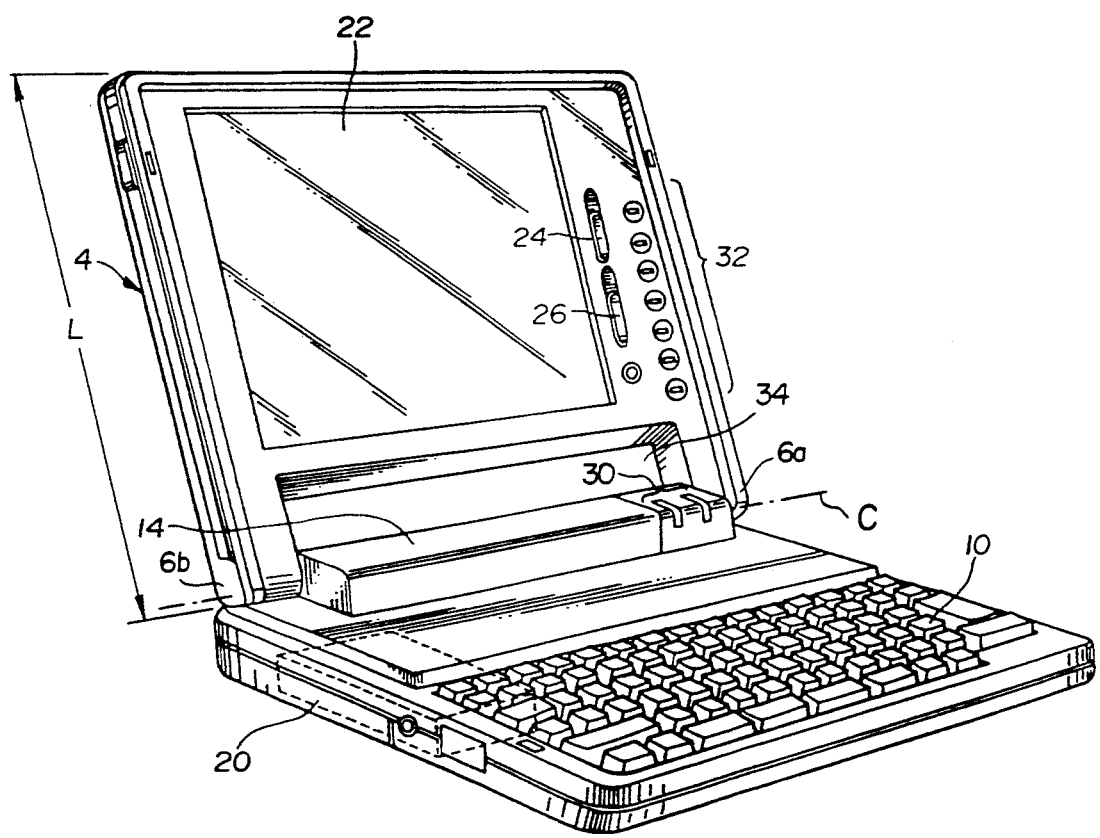
FIG. 1 is a perspective view of a portable computer according to an embodiment of the invention, with its cover section open.
Figure 2:
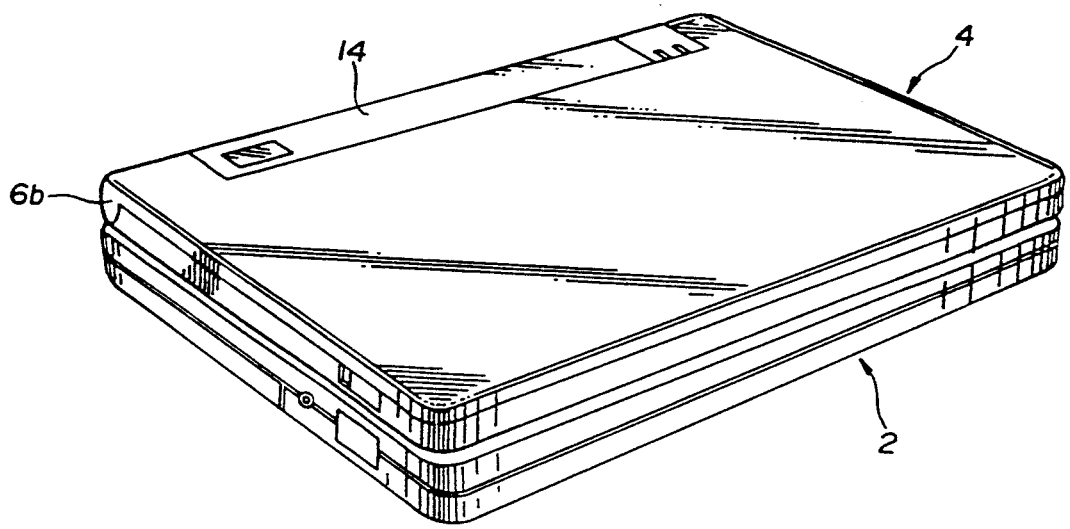
FIG. 2 is a perspective view of the portable computer in FIG. 1, with its cover section closed.
Figure 3A:
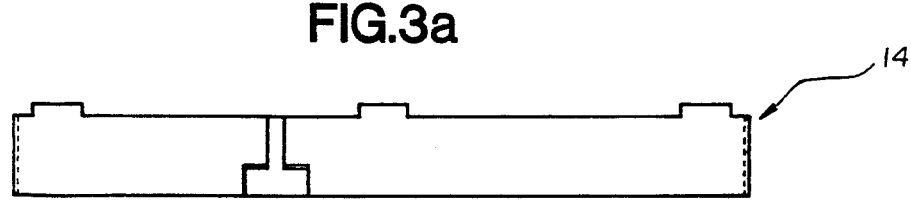
FIG. 3(a) is a front view of a battery chamber of the portable computer.
Figure 3B:
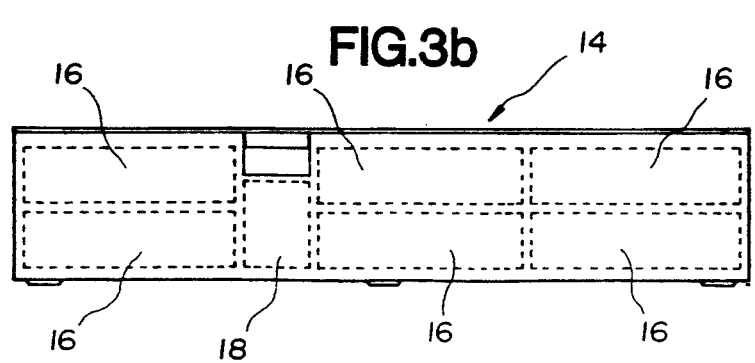
FIG. 3(b) is a plan view of the battery chamber.
Figure 3C:
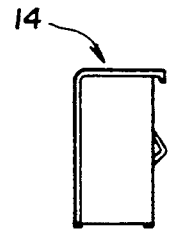
FIG. 3(c) is a side view of the battery chamber.
Figure 4:
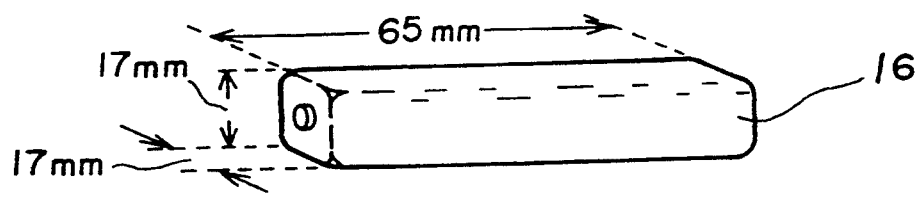
FIG. 4 is a perspective view of a battery to be used in the embodiment.

An embodiment of the present invention will be described referring to the accompanying drawings, as follows. FIG. 1 is a perspective view of a portable computer as an embodiment of the invention, when its cover section is opened; FIG. 2 is a perspective view of the computer when its cover section is closed; FIG. 3(a) is a front view of a battery chamber, FIG. 3(b) is a plan view of the battery chamber, and FIG. 3(c) is a side view of the battery chamber; and FIG. 4 is a perspective view of a battery to be enclosed in the battery chamber.

The portable computer shown in FIG. 1 comprises a body section 2, a cover section 4, and a pair of hinge portions 6a, 6b, provided at the bottom left and right corners of the cover section 4. The body section 2 and the cover section 4 are coupled rotatable by the hinge portions 6a, 6b. The portable computer of the embodiment has in use the state of the cover section 4 being opened as shown in FIG. 1. The embodiment can take on a thin book-shape convenient for carrying, by closing the cover section 4 to cover the entire top surface of the body section as shown in FIG. 2. The body section 2 is provided with a battery chamber (battery enclosing portion) 14 between the hinge portions 6a, 6b, a keyboard 10 is installed on the front surface of the body section 2, and a floppy disk drive unit 12 (see FIG. 6) is installed in the inside at right side thereof. Also, a modem enclosing portion 20 enclosing a modem exclusive for card type is provided within the left side of the body section 2.

The cover section 4 is provided with a liquid crystal display unit of the back light type on the surface opposing the keyboard 10 when the cover member 4 is closed, and a contrast control element 24 and a brightness control element 26, each of slide type, are installed in the right side vicinity of the display unit 22. An indicator 32 to the right of these control elements indicates the present operating state of the apparatus by lighting of an LED.

As a back light (not shown) for the liquid crystal display unit, a fluorescent light or an EL (Electroluminescence) element is usually used, and in order to energize these, the cover section 4 incorporates an inverter for supplying AC power. The back light is installed to the right side of the liquid crystal display unit 22, and illuminates the liquid crystal display unit 22 from the right side.

As shown in FIG. 1, the cover section 4 of the embodiment is installed to the rear end of the body section 2 so as to be rotatable about the left-to-right extending rotational axis C by the hinge portions 6a, 6b. This becomes possible because the battery chamber 14 is installed between the hinge portions 6a, 6b. As a result, height (depth in the closed state) L of the cover section 4 shown in FIG. 1 can be made larger than that of the prior art; thereby the dimension l of the liquid crystal display unit 22 can be made larger than that of the prior art. Consequently the liquid crystal display unit 22 can be easily seen and the operability of the computer is improved.

As shown in FIG. 3(b), two lines each composed of three cells 16 in the longitudinal direction are arranged in the inside of the battery chamber 14. Each cell is, for example, a Ni-Cd cell of prism shape with dimensions 17 mm-by-17 mm-by 65 mm, as shown in FIG. 4. The battery chamber 14 with the cells 16 installed in the inside can be detached from the body section 2. Consequently, when the cell 16 are charged or replaced by a new one, the battery chamber 14 with the six cells packed can be treated as an integral body. In FIG. 3, numeral 18 designates a detector detecting the residual energy remaining in the cells.

In the battery chamber 14, although three lines each composed of the two cells in the longitudinal direction are arranged in the prior art, the cells 16 are arranged as shown in FIG. 3(b) in the embodiment whereby the depth dimension of the whole apparatus can be decreased without decreasing the size of the liquid crystal display unit 22. Since the battery chamber 14 is installed between the hinge portions, a recess 34 must be provided in the cover section 4 between the two hinge portions. In the embodiment, however, since the cells 16 are arranged as shown in FIGS. 3a, 3b and 3c, the depth dimension of the battery chamber 14 is decreased, whereby the recess 34 can be held to a small value and dimension l of the liquid crystal display unit 22 can be increased corresponding to the decreased size of the recess.

Figure 5:
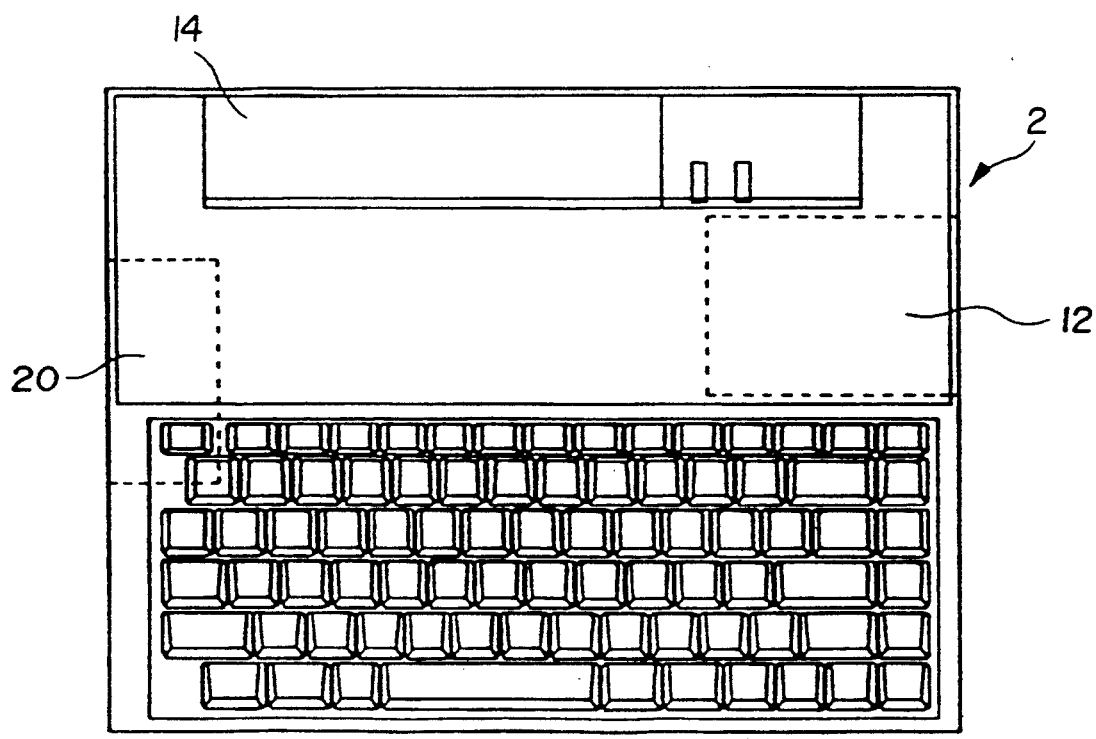
FIG. 5 is a plan view of a body section of the embodiment.

Next, the modem enclosing portion of the embodiment will be described referring also to FIG. 5. FIG. 5 is a plan view of the body section 2. As shown in FIG. 1 and FIG. 5, in the embodiment the modem enclosing portion 20 enclosing a modem (not shown), for exclusive use of card type detachably installed, is provided inside of the left side of the body section 2. The modem for exclusive use of card type is constituted in the same dimension as that of a connector for RS-232 also detachably installed, whereby the modem enclosing portion 20 selectively encloses the modem for exclusive use and the connector of the RS-232C bus. Consequently, when the modem for exclusive use is used, this is installed to the modem enclosing portion 20, and when the usual external mode is used, the connector for RS-232C is installed. In fact, since the modem for exclusive use and the external modem are not used simultaneously, such a constitution does not produce a problem in operation.

Since the modem enclosing portion 20 is installed inside a lateral side of the body section 2, and further the battery chamber 14 is installed between a pair of hinge portions 6a, 6b, both hinge portions can be installed at the rear end of the apparatus, whereby the depth of the whole apparatus can be decreased in comparison to a conventional one and the portability of the computer can be improved. Also the modem enclosing portion 20 can enclose both the modem for exclusive use and the connector selectively, whereby space efficiency is improved and the apparatus can be reduced in size.

Figure 6:
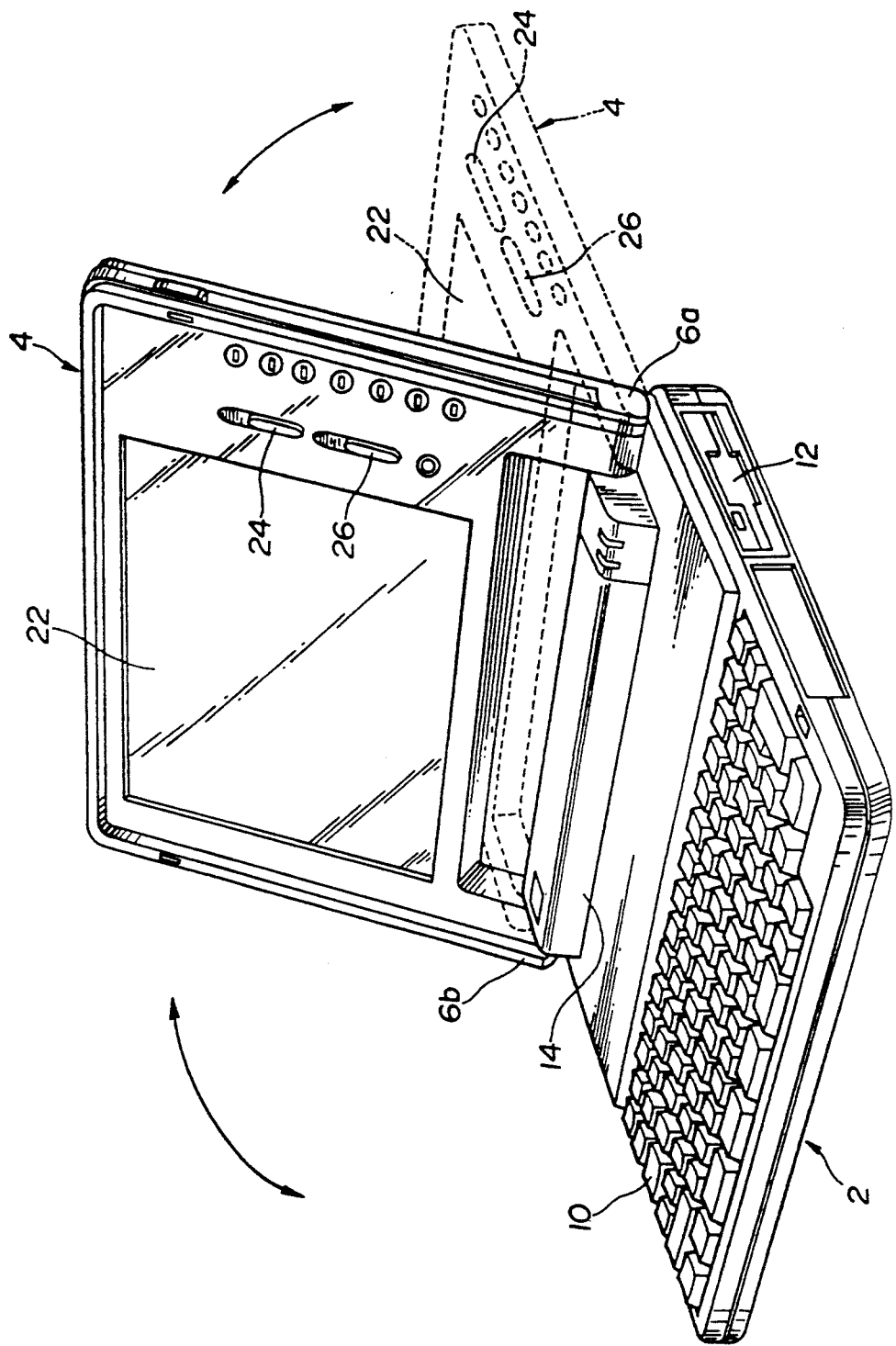
FIG. 6 is a perspective view illustrating the range of rotation of the cover section of the embodiment.

Next, the range of rotation of the cover section 4 of the embodiment will be described referring also to FIG. 6. FIG. 6 is a perspective view for illustrating the rotational range of the cover section of the portable computer shown in FIG. 1. As shown in FIG. 1 and FIG. 6, the cover section 4 of the embodiment is coupled with the body section 2 at the rear end of the body section 2 by the hinge portions 6a, 6b installed at both ends of the cover section 4. Also, the battery chamber 14 is installed between the hinge portions 6a, 6b. In the battery chamber 14, although three lines each composed of two cells in the longitudinal direction are arranged in the prior art, two lines each composed of three cells in the longitudinal direction are arranged in the embodiment. As a result of such constitution, the width of the battery chamber 14 is decreased, whereby the battery chamber 14 does not significantly obstruct rotation of the cover section 4.

Thus, in the embodiment, when the cover section 4 is rotated, nothing obstructs the rotational range. Consequently, the cover section 4 can be rotated by 180 degrees with respect to the body section 2 as shown by dotted line in FIG. 6, and can be fixed at any angle within the range of 180 degrees.

When a portable computer of laptop type is used outdoors or by a passenger of a vehicle, it is frequently used holding the body section on the knees. In such a case, in consideration of reflection angle of external light, the cover body 4 is opened to the most suitable angle within the range of 180 degrees, thereby eyes can be directed substantially orthogonal to the liquid crystal display unit 22 and the display content of the liquid crystal can be easily seen. In ordinary use on a desk or the like, the open angle of the cover section 4 may be fixed, for example, to about 135 degrees. Thus, since the angle of the cover section 4 can be adjusted corresponding to various uses, the range of uses can be extended significantly and the operability of the computer is improved.

What is claimed is:

1. A portable computer, comprising:

a body section having a top surface bounded by a rear end, said body section having a keyboard arranged on said top surface, and a battery enclosing portion at said rear end;

a cover section having opposite left and right sides, said cover section including a display unit; and first and second spaced apart hinge portions connected to said cover section respectively at said left and right sides, said hinge portions pivotally mounting said cover section to said rear end of said body section such that said battery enclosing portion is between said hinge portions and said cover section is pivotable between an open position in which said display unit is exposed and a closed position in which said cover section covers said top surface, said hinge portions and said cover section bounding a recess, said battery enclosing portion being fitted in said recess when said cover section is in said closed position.

2. A portable computer according to claim 1, wherein said cover section is pivotable through 180 degrees between the open position and the closed position.

3. A portable computer, comprising:

a body section having a top surface bounded by a rear end, said body section having a keyboard arranged on said top surface, and a battery enclosing portion at said rear end;

a cover section having opposite left and right sides, said cover section including a display unit; and first and second spaced apart hinge portions connected to said cover section respectively at said left and right sides, said hinge portions pivotally mounting said cover section to said rear end of said body section such that said battery enclosing portion is between said hinge portions.

4. A portable computer according to claim 3, and said cover section is pivotable about an axis which extends through said first and second hinges, further comprising two lines of three battery cells each in said battery enclosing portion, the lines being parallel to said axis.

5. A portable computer, comprising:

a body section having a top surface bounded by opposite left and right sides and opposite front and rear ends, said body section having a keyboard arranged on said top surface, a modem enclosing portion in one of said left side and said right side, between said front and rear ends, a modem in said modem enclosing portion; and a battery enclosing portion at said rear end;

a cover section having opposite left and right sides, said cover section including a display unit; and first and second spaced apart hinge portions connected to said cover section respectively at said left and right sides, said hinge portions pivotally mounting said cover section to said rear end of said body section such that said battery enclosing portion is between said hinge portions.

* * * * *